(12) United States Patent
Amram et al.

(10) Patent No.: US 10,454,939 B1
(45) Date of Patent: Oct. 22, 2019

(54) METHOD, APPARATUS AND COMPUTER PROGRAM PRODUCT FOR IDENTIFYING EXCESSIVE ACCESS RIGHTS GRANTED TO USERS

(71) Applicant: EMC Corporation, Hopkinton, MA (US)

(72) Inventors: Shay Amram, Holon (IL); Alex Zaslavsky, Petah Tikva (IL); Carmit Sahar, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 306 days.

(21) Appl. No.: 15/198,692

(22) Filed: Jun. 30, 2016

(51) Int. Cl.
*H04L 29/06* (2006.01)

(52) U.S. Cl.
CPC .......... *H04L 63/102* (2013.01); *H04L 63/104* (2013.01); *H04L 63/105* (2013.01)

(58) Field of Classification Search
CPC .................................................... H04L 63/102
USPC ............................................................ 726/4
See application file for complete search history.

(56) References Cited

U.S. PATENT DOCUMENTS

| | | | |
|---|---|---|---|
| 8,760,281 B1* | 6/2014 | Rana ...................... | G06Q 10/10 340/521 |
| 2005/0216468 A1* | 9/2005 | Fujiwara ............ | G06F 17/30286 |
| 2007/0214497 A1* | 9/2007 | Montgomery ...... | G06F 21/6218 726/4 |
| 2009/0189736 A1* | 7/2009 | Hayashi .................. | G06F 21/32 340/5.81 |
| 2011/0199214 A1* | 8/2011 | Gawlick .............. | A61B 5/0008 340/573.1 |
| 2014/0373105 A1* | 12/2014 | Hu ......................... | G06Q 40/02 726/4 |

* cited by examiner

*Primary Examiner* — Khalil Naghdali
(74) *Attorney, Agent, or Firm* — Krishnendu Gupta

(57) ABSTRACT

There is disclosed in one embodiment a method comprising the step of determining, access rights granted to a first user that enables access to a computerized resource. The method also comprises the step of comparing the access rights granted to the first user against access rights granted to a second user associated with the first user. The method further comprises the step of providing a warning when the comparison indicates that the first user has excessive access rights over the second user.

3 Claims, 5 Drawing Sheets

| USER IDENTIFIER | USER RIGHTS |
|---|---|
| USER B | APP1 |
| USER B12 | APP1 |
| USER B22 | APP1, APP2 |
| USER B12a | APP1 |
| USER B13 | APP1 |
| USER B23 | APP1 |

FIG. 4

METHOD, APPARATUS AND COMPUTER PROGRAM PRODUCT FOR IDENTIFYING EXCESSIVE ACCESS RIGHTS GRANTED TO USERS

TECHNICAL FIELD

The present invention relates generally to user access rights. More specifically, the present invention relates to a method, an apparatus and a computer program product for identifying excessive access rights granted to users.

BACKGROUND OF THE INVENTION

The widespread use of computer systems, especially within networked computing environments, has created many different classes of computer users and has created a need for access control systems to govern how users can access such computer systems. As an example, consider a local area network (LAN) computing environment such as a corporate computer network, commonly referred as an intranet. The intranet network may include various computing systems such as intranet file servers, intranet web-servers, departmental computer systems, database servers, and so forth. Each computing system allows users and/or software programs to create and maintain directories, files, databases, or the like within data storage systems such as one or more disk drives coupled to the computing systems. The storage systems may contain varying amounts and types of data. Various users may control and access the different computing systems at different times of the day or night.

In such a computing environment, access control is an important aspect of system design and provides controlled access to files or other resources within the computing systems. Most conventional computing systems operate using an operating system that provides certain basic access control mechanisms. Using such conventional access control mechanisms, a computer systems manager or administrator (a person responsible for maintaining the computer systems) can configure, for example, an operating system in a computer system to control how that computer system allows users to access various directories and files maintained under control of the operating system.

Unfortunately, there are deficiencies associated with the above-described conventional approaches to controlling access. For example, authorization creep or privilege creep is a problem that manifests itself when a user accumulates access rights over time resulting in the user having unnecessarily wide access privileges within the organization. This is a common problem in organizations when a user moves up or laterally in an organization due to the user accumulating new access rights in order to be able to meet the requirements of the new role. As will be appreciated, often previous access rights go unchecked, resulting in the retention of these rights. This can create security risks. For example, a user with excess privileges may be tempted to abuse them by accessing applications and data in an unauthorized manner. Also, if an intruder gains access to a user's account that possesses excess privileges, the intruder will also have those excess privileges. Both scenarios can result in data loss or theft. There is, therefore, a need to address this problem.

SUMMARY OF THE INVENTION

There is disclosed a method, comprising: determining, by processing circuitry, access rights granted to a first user, wherein the access rights enable access to a computerized resource; comparing, by processing circuitry, the access rights granted to the first user against access rights granted to a second user associated with the first user; and providing, by processing circuitry, a warning when the comparison indicates that the first user has excessive access rights over the second user.

There is also disclosed an apparatus, comprising: memory; and processing circuitry coupled to the memory, the memory storing program code which, when executed by the processing circuitry, cause the processing circuitry to: determine access rights granted to a first user, wherein the access rights enable access to a computerized resource; compare the access rights granted to the first user against access rights granted to a second user associated with the first user; and provide a warning when the comparison indicates that the first user has excessive access rights over the second user.

There is further disclosed a computer program product having a non-transitory computer readable medium which stores a set of instructions, the set of instructions, when carried out by processing circuitry, causing the processing circuitry to perform a method, the method comprising: determining, by processing circuitry, access rights granted to a first user, wherein the access rights enable access to a computerized resource; comparing, by processing circuitry, the access rights granted to the first user against access rights granted to a second user associated with the first user; and providing, by processing circuitry, a warning when the comparison indicates that the first user has excessive access rights over the second user.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 4 is a diagram of user access rights stored on an access control server of FIG. 1.

DETAILED DESCRIPTION

Figure 1:
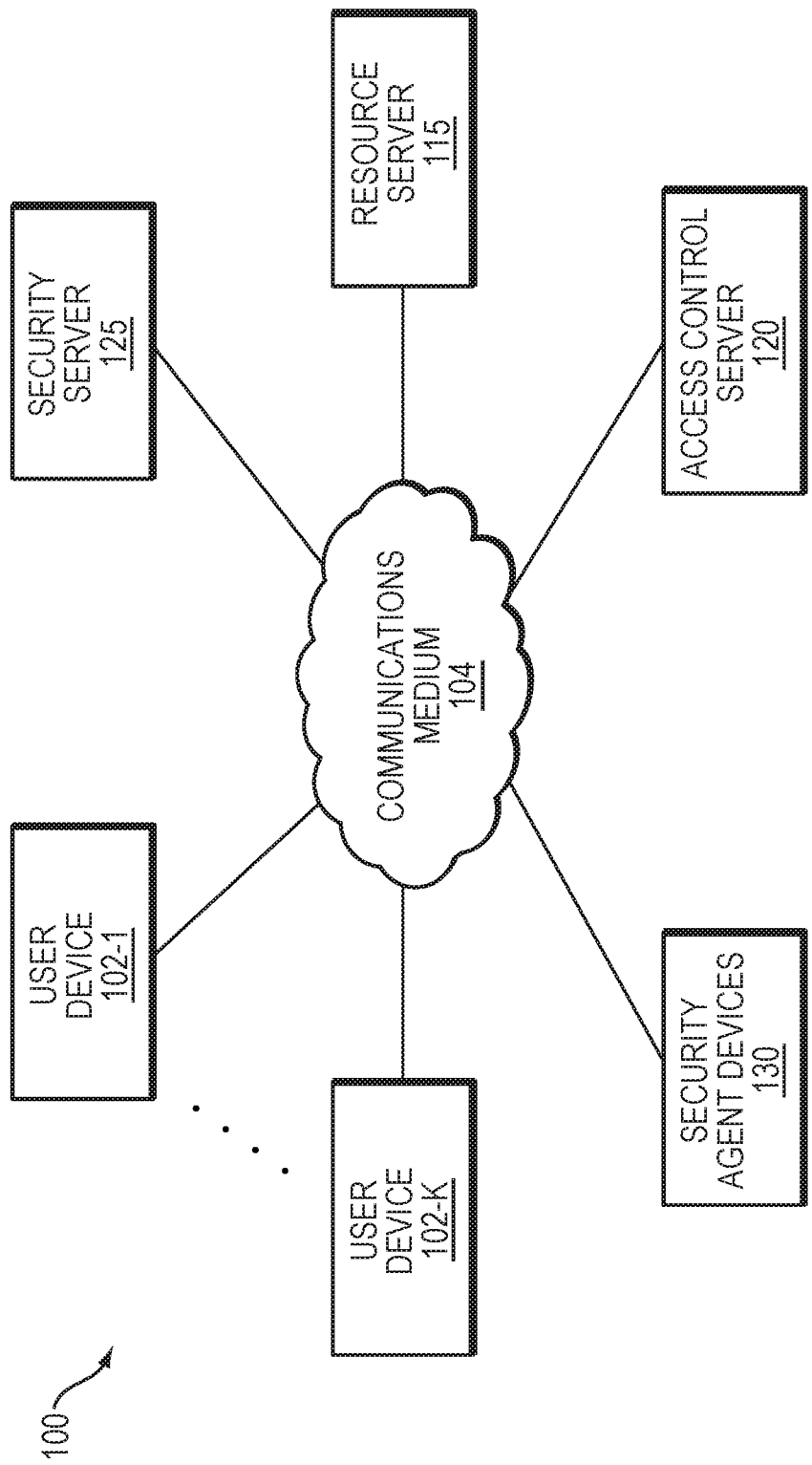
FIG. 1 is a schematic diagram of an electronic environment configured to carry out the improved technique.

FIG. 1 shows an electronic environment 100 configured to carry out the improved technique. Electronic environment 100 includes communications medium 104, a plurality of user devices 102-1, . . . 102-K (collectively referred to herein as user devices 102), resource server 115, access control server 120, security server 125 and security agent devices 130.

Communications medium 104 provides connections between the various components illustrated in FIG. 1. The communications medium 104 may implement a variety of protocols such as TCP/IP, UDP, ATM, Ethernet, Fibre Channel, combinations thereof, and the like. Furthermore, the communications medium 104 may include various components (e.g., cables, switches, gateways/bridges, NAS/SAN appliances/nodes, interfaces, etc.). Moreover, the communications medium 104 is capable of having a variety of topologies (e.g., hub-and-spoke, ring, backbone, multi-drop, point-to-point, irregular, combinations thereof, and so on).

User devices 102 are constructed and arranged to run software configured to permit users of the user devices to send, to resource server 115, a request for access to a computerized resource stored on resource server 115. User devices 102 can take the form of any machine having a processor which can run the software; examples of such machines are desktop computers, laptop computers, personal digital assistants (PDAs), cell phones, tablet computers and servers.

Resource server 115 is constructed and arranged to provide access to computerized resource. Examples of computerized resources for which a user may wish to access include, but are not limited to, documents, image files, video files disk drives, VM images and applications.

Access control server 120 is constructed and arranged to either grant or deny access to computerized resource. In granting or denying access to the computerized resource, access control server 120 identifies access rights granted to specific users. For example, if the computerized resource relates to an application, some users will have access rights to the application. Access control server 120, therefore, makes a decision regarding access to the computerized resource based upon the access rights. It should, however, be appreciated that the access control server 120 may also make such decisions based on other factors. For example, access control server 120 may obtain an access history (e.g., user access history) associated with previous requests to access computerized resource. The user access history, in some embodiments, comprises respective timestamps and other authentication information characterizing logins to the computerized resource. The decision regarding access may, therefore, also be based on the user access history and features of a current request to access computerized resource.

Security server 125 is constructed and arranged to evaluate the access rights granted to users to identify when excessive access rights have been granted to users. The security server 125 may be configured to evaluate the access rights at any time regardless of whether or not a request is received to access the computerized resource. Security server 125 may also be configured to have access to information relating to access rights granted to specific users. For example, in one embodiment, the security server 125 may request this information from the access control server 120. Furthermore, security server 125 is constructed and arranged to have access to an organizational chart of users within an organization. Access to the organizational chart enables the security server 125 to compare access rights of users within an organizational group with a view to issuing an alert or warning to security agent devices 130 when a user in the organizational group has excessive access rights over other users in the organizational group.

In the present embodiment, alerts or warnings generated by the security server 125 are provided over the communications medium 104 to one or more security agent devices 110. Such devices, like the user devices 102, can comprise mobile telephones, laptop computers, tablet computers, desktop computers, or other types of computers or processing devices configured for communication over the communications medium 104 with the security server 125. For example, a given security agent device can comprise a mobile telephone equipped with a mobile application configured to receive alerts from the security server 125 and to provide an interface for a security agent to select particular remedial measures for responding to the alert. Examples of such remedial measures may include logging off the user with the excessive access rights or modifying the access rights associated with the user.

It should be noted that a "security agent" as the term is generally used herein may comprise, for example, an automated entity, such as hardware, software or firmware entity running on a processing device.

During operation, the security server 125 evaluates user access rights with a view of identifying excessive rights granted to a user. Firstly, security server 125 obtains access rights from the access control server 120. It will be noted that the access control server 120 comprises access control information in connection with users to facilitate granting or denying access to the computerized resource on the resource server 115. Security server 125 requests this information from the server 120 periodically. An organization chart describing the users and their reporting hierarchies within the organization is stored in the security server 125. The security server 125 evaluates the organization chart and identifies users associated with a group or department within the organization. Once the group is identified, the security server 125 processes the information by comparing user access rights granted to users within the group. If one of the users comprises excessive rights over other users, a warning is issued by the security server 125 to the security agent devices 130. These devices 130 can take remedial action as described above.

Figure 2:
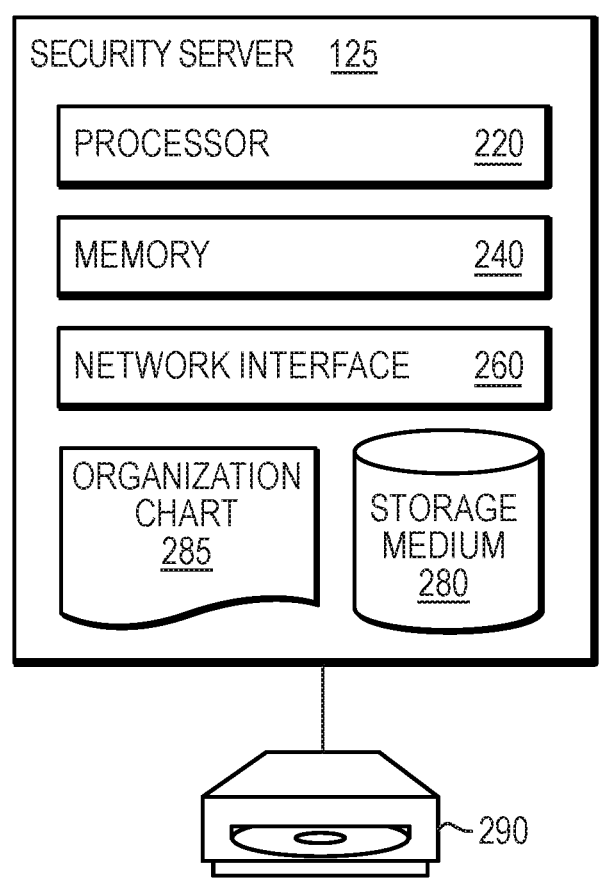
FIG. 2 is a schematic diagram of a security server for use in the electronic environment of FIG. 1.

FIG. 2 shows further detail of security server 125. Security server 125 includes processor 220, memory 240 and network interface 260. In some arrangements, security server 125 further includes a storage medium 280.

Memory 240 is configured to store a computer program 290 which is constructed and arranged to evaluate access rights of certain users with the view of identifying a user with excessive access rights. Memory 240 generally takes the form of, e.g., random access memory, flash memory or a non-volatile memory.

Processor 220 can take the form of, but is not limited to, an Intel or AMD-based MPU, and can be a single or multi-core running single or multiple threads. Processor 220 is coupled to memory 240 and is configured to execute the computer program 290 stored in memory 240.

Network interface 260 is constructed and arranged to send and receive data over communications medium 104. Specifically, network interface 260 is configured to send warnings to security agent devices 130 when a user is deemed to have excessive access rights. Also, network interface 260 is configured to request and receive data relating to user access rights from the access control server 120 in the event that such data is stored exclusively at the access control server 120.

In some arrangements, storage medium 280 is constructed and arranged to store organization chart 285. The organization chart 285 will be described further below with respect to FIG. 3.

Figure 3:
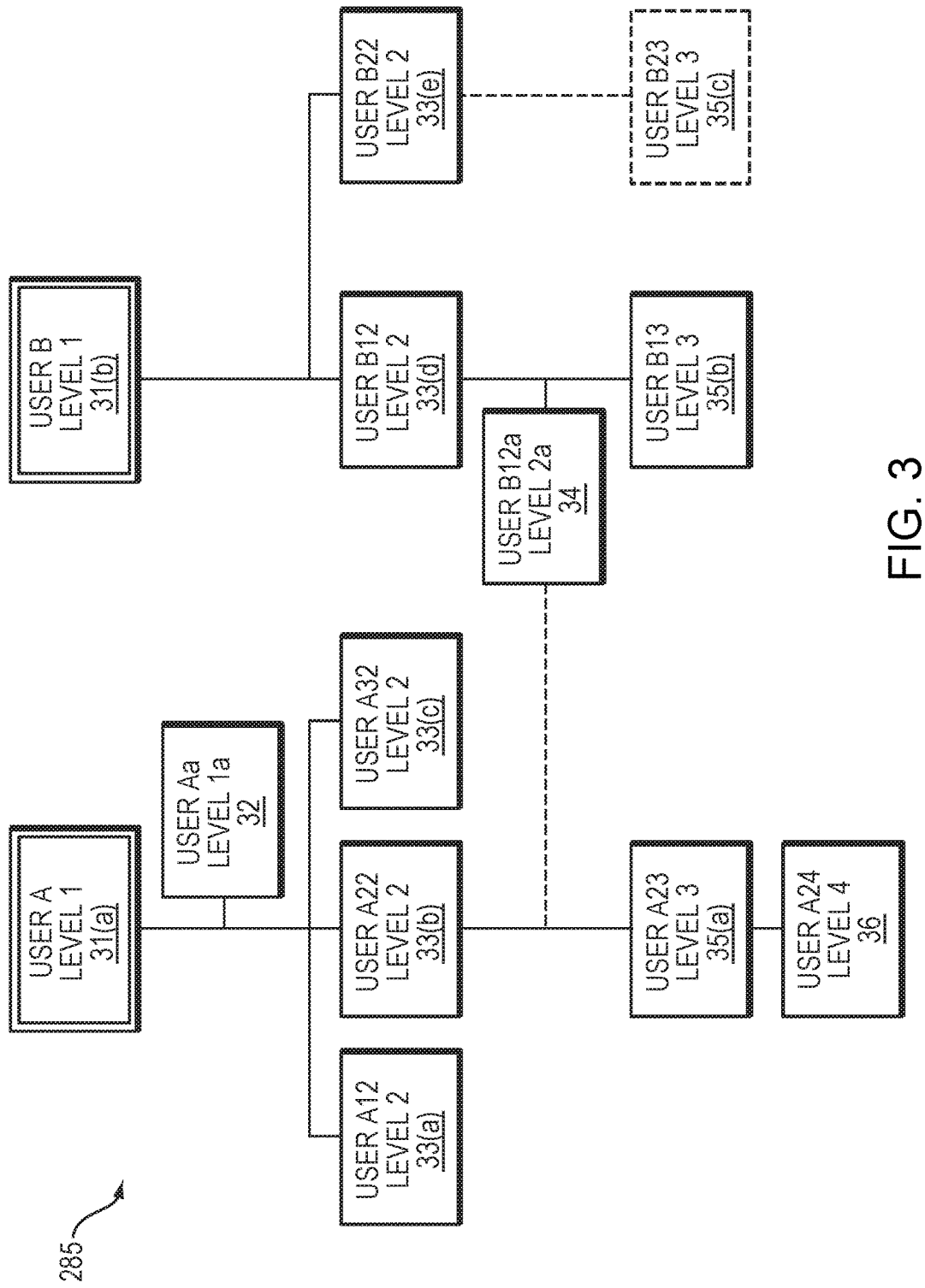
FIG. 3 is a diagram of an organization chart stored on the security server of FIG. 2.

FIG. 3 shows further details of an example of organization chart 285. In organization chart 285 are representations of employees within the organization and their reporting hierarchies. For example, Blocks 31(*a*) and 31(*b*) [blocks 31] correspond to user identifiers User A and User B, respectively, and represent two users at the top of the organization's hierarchy. These user identifiers are assigned a hierarchal level 1. Blocks 33(*a*), 33(*b*), 33(*c*), 33(*d*) and 33(*e*) [blocks 33] have user identifiers User A12, User A22, User A32, User B12 and User B22, respectively. Users having user identifiers User A12, User A22 and User A32 directly report to User A and are assigned a hierarchal level 2; users having user identifiers User B12 and User B22 directly report to the user having user identifier User B and are also assigned a hierarchal level 2. Blocks 35(a), 35(b) and 35(c) [blocks 35] correspond to users having user identifiers A23, B13 and B23, respectively and are assigned a hierarchal level 3. Block 36 corresponds to the user having user identifier A24 and is assigned a hierarchal level 4.

In some arrangements, organization chart 285 distinguishes between types of employees. For example, Block 32 corresponds to the user having user identifier Aa and is representative of a secretarial or administrative assistant position. In some organizations, such a user would have access to the same resources as User A with the exception of certain personnel files. Another administrative assistant in Block 34, corresponding to the user with user identifier B12a, reports directly to the user with user identifier B12. This administrative assistant, however, has a dotted line relation to the user with user identifier A22. This could imply that this administrative assistant has access to the same resources as the user with user identifier B12 and some access to the resources which the user with user identifier A22 has. As another example, Block 35(c) corresponds to a user having user identifier User B23 and is representative of a consultant who may not be a full-time employee of the organization.

In some arrangements, organization chart 285 further identifies a department or group to which a user belongs. In the example organization chart 285, users having user identifiers with an "A", e.g., User A, User A12, etc., would correspond to a Department A, while users having user identifiers with a "B" would correspond to Department B. The "A" and the "B" in the user identifiers server as department identifiers.

It should be appreciated that the security server 125 is able to evaluate the chart 285 and identify groups or departments within the organization. As discussed above in connection with FIG. 1, the server 125 can proceed to then compare access rights granted to users within the group. However, the server 125 may also take into consideration the security classification of users when comparing the access rights. For example, if a hierarchal level 1 comprises extra rights over other hierarchal level users in the group, the security server 125 may be configured to deem this acceptable due to the fact that the hierarchal level 1 is management and has a higher hierarchal level. Higher hierarchal levels of users within a group should, therefore, be entitled to have some extra rights over sub-ordinates users within the group. This is not to say that the hierarchal level 1 may be entitled to all rights. For example, the hierarchal level 1 user may be the head of Department A, but that does not necessarily entitle that user to rights in connection with Department B which would be deemed to be excessive rights if granted to that user. The security server 125 is configured to take this into consideration.

FIG. 4 shows further details of an example diagram 400 representing user access rights. The diagram includes entries 401(a), 401(b), 401(c), 401(d), 401(e) and 401(f) [entries 401] with each entry containing a user identifier associated with one of the users in Department B described in FIG. 3. As will be seen, each entry also includes user rights (access rights) associated with each user in, this particular example, Department B. For example, in one particular embodiment, the access rights relate to applications to which the respective users have access. It should be understood that in this particular embodiment that each user has access to App1. However, it will be noted that User B22 has access to App2 as well. As discussed earlier, the additional user access rights may have been obtained by the user prior to joining Department B. Further, these additional user access rights may be deemed to be excessive rights. For example, App2 may relate to Department A described in FIG. 3. Departments A and B may be entirely separate departments. Security server 125 would, therefore, issue a warning regarding excessive rights being granted to User B22.

Figure 5:
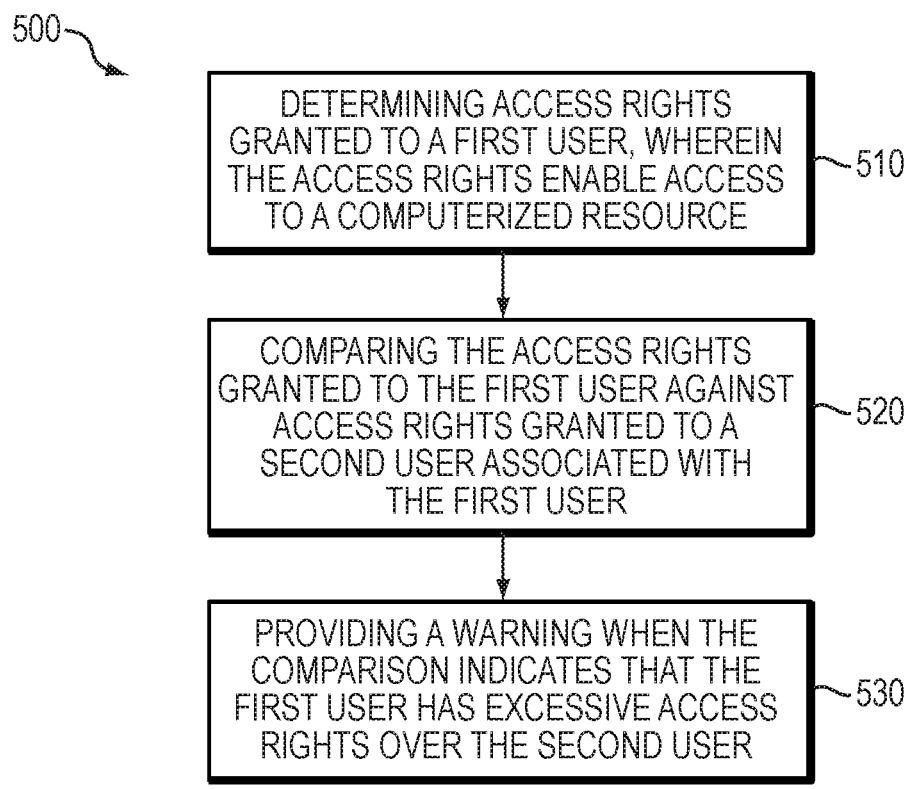
FIG. 5 is a flow chart illustrating a method of carrying out the improved technique.

FIG. 5 shows a method 500 for carrying out the improved technique. In step 510, access rights granted to a first user are granted. The access rights are suitable to enable access to a computerized resource. In step 520, access rights granted to the first user are compared against access rights granted to a second user associated with the first user. In step 530, a warning is provided when the comparison indicates that the first user has excessive access rights over the second user.

It should also be understood that when the comparison indicates that the first and second users have similar access rights, the method determines user behaviour by the first and second users relating to the utilization of the access rights. It may subsequently decide to issue a warning indicating excessive utilization of access rights when deviation between the user behaviour of the first and second users. Also, in some embodiments, a learning engine may be adopted that enables detection of anomalies by profiling the behavior of a user and a group of peers (for example, a developer with respect to his or her team). A common example is when users connect from the office or home: connecting from office would be a normal group-behavior, while connecting from home is normal user-specific. The approach is able to balance and learn these usage patterns for each user/group and flag any abnormalities, such as user connecting from different non-office and non-home locations. In other words, it is able to assess whether a behavior is anomalous for user with respect for other users in the same group. By using this approach it is possible to identify users-groups who commonly access an application, and use anomaly detection module to detect anomalies in access.

The above method 500 can be described further by way of specific use cases. For example, in one case, a first user moves from HR to General Administration, but the first user still retains HR access credentials or access rights. As will be appreciated, the 'access-space' of credentials within the new group is significantly different from the HR group. In this case, an anomaly detection model used by the security server would compare access rights with those of his new peers and flag the anomaly for review such that the first user's privileges can be adjusted. Note that this would happen even if the first user made no attempt to access any HR application as the model can directly get data relating to access rights and compare the first users 'access-space' to other users in the new group. In this use case, the first user is prevented from accumulating excess privileges and the risk of authorization creep is eliminated.

In a separate use case, a HR representative can access information regarding salaries in the organization and this is normal as all of that users peers are doing so as well. However, if a member of the engineering team behaved in this manner, it would be highly irregular, even if, by accident, the engineering-user somehow had valid credentials to the HR application. The anomaly detection module in the security server would recognize that the engineering members (the group) do not access HR applications and flag this abnormality to the organization's security office for inspection. Following the review, the user's privileges may be re-evaluated and modified if necessary.

Another use case involves analyzing the user and the destination, e.g. database tables, database disks. That is, analyzing not only the access to the actual application, but also within the application, alerting when the user is doing things which are not typical to the user's group and roles. As will be understood, both Engineering and Support users may have access to the same databases, but are doing significantly different operations. For example, accessing table 'A' in the database might be usual for the engineer, but very abnormal for support. This type of scenario may occur when privileges are poorly maintained or when manually maintaining this level of granularity is simply impractical. By tracing the operations the user is doing within the application, and detecting anomalies in the usage patterns, it becomes practical to maintain security of access even when access privileges are broad, and many users may have the access right to the same resource. The security server described herein, in at least one particular embodiment, reviews each request separately, thus combining manageable access rights while maintaining security by inspecting each request in the context of the user. It should be appreciated that having the right to a resource does not blindly guarantee access to the resource. Patterns, along with time, day and other information, are used together with the anomaly-detection module to make a dynamic and automatic decision for accessing the resource. Unusual access patterns can then be met by high-level security policies (authentication-challenge, security review, etc.).

For example, a developer might be using table 'A' (the resource) frequently for a current project. Other developers in the team may also access table 'A'. After the project is complete, and the group no longer accessing 'A', they retain access permissions to it unless actively revoked by the organization. In this scenario, the entire group may retain excess privileges to a resource they no longer need or use. With the approach described, accessing table 'A' after completion of the project would be flagged for inspection, since the group as general is no longer using the table and any subsequent usage would be flagged as an anomaly. Note that this may happen automatically just by the patterns of usage and without configuring access to 'A' in any explicit manner in the system.

Advantageously, the above describe solutions provide fully automated anomaly detection to enforce, enhance, and complement existing rule-based policies. Little or no human intervention is required and anomalies and risks are flagged when encountered. It combines the advantage of having manageable access rights (instead of extremely granular, high-maintenance ones) while maintaining security of the resource. It also makes sure the resource is used by allowed roles only to the extent they are permitted to interact with it. Any suspicious abnormal activity would be flagged for inspection. Any excess access rights (which is the hallmark signature of authorization creeping) are flagged automatically, based on comparison with the user group, and without need for human intervention.

In addition, having the technical right to access a resource does not grant the user with a 'blank check' to access the resource wherever and whenever, but rather imposes controls. These controls limit unauthorized exploitation of the resource, outside the scope of the role of the user (e.g., a developer can have access to table A, but interacting with it suspiciously, like downloading high volumes of data could be anomalous when compared to activities done by the group. This would trigger a review).

While the above disclosure makes reference to an example in which access control systems govern control to a local area network (LAN) computing environment, it should be appreciated that this is an example only and that the technique may be suitable for use in connection with all other environments. For example, many resources are located on the cloud, and many networks employ SSO (Single-Sign-On) technology. The technique may be suitable for use in connection with these resources as well (e.g., SalesForce, Concur, etc.).

While the above disclosure makes reference to the security server 125 being constructed and arranged to have access to an organizational chart of users within an organization, it should also be understood that it may also possible to determine user groups and peers heuristically by using machine learning algorithms in the absence of an organizational chart. Alternatively, the data can be presented to server 125 in some form other than an organizational chart.

While various embodiments of the invention have been particularly shown and described, it will be understood by those skilled in the art that various changes in form and details may be made therein without departing from the spirit and scope of the invention as defined by the appended claims.

Furthermore, it should be understood that some embodiments are directed to an electronic environment which utilizes systems that evaluate user access rights with a view to identifying excessive access rights granted to users. Some embodiments are directed to security server. Some embodiments are directed to a system that evaluates user access rights with a view to identifying excessive access rights granted to users. Some embodiments are directed to a process of evaluating user access rights to identify excessive access rights granted to users. Also, some embodiments are directed to a computer program product which enables computer logic to evaluate user access rights with a view to identifying excessive access rights granted to users.

In some arrangements, security server 125 is implemented by a set of processors or other types of control/processing circuitry running software. In such arrangements, the software instructions can be delivered to the security server 125 in the form of a computer program product 290 (illustrated generally by a diskette icon 290 in FIG. 2) having a computer readable storage medium which stores the instructions in a non-volatile manner. Examples of suitable computer readable storage media include tangible articles of manufacture and apparatus such as CD-ROM, flash memory, disk memory, tape memory, and the like.

What is claimed is:

1. A method, comprising:

evaluating, by processing circuitry, access rights granted to one or more computerized resources, wherein the said evaluation comprises (i) determining access rights granted to one or more users in a group, (ii) determining access rights granted to the group, (iii) determining a hierarchal level of the one or more users in the group in which each user is organized at one of a plurality of hierarchal levels such that the respective hierarchal levels describe a corresponding level of access rights and a user at a higher hierarchal level is entitled to extra access rights over a sub-ordinate user at a lower hierarchal level, and (iv) determining a role of the one or more users in the group such that at least one role enables a sub-ordinate user to have similar access rights to a user at a higher hierarchal level;

determining, by processing circuitry, appropriate access rights for each of the one or more users in the group based on the access rights granted to the group and the hierarchal level of the respective users and the role of the one or more users in the group;

comparing, by processing circuitry, the access rights granted to each of the one or more users in the group against the appropriate access rights for that user in order to determine if excessive access rights have been granted to that user; and based on the comparison, controlling, by processing circuitry, access to the one or more computerized resources by modifying the access rights of one or more users having excessive access rights such that the one or more users are prevented from exercising the excessive access rights in connection with the one or more computerized resources.

2. An apparatus, comprising:

memory; and processing circuitry coupled to the memory, the memory storing program code which, when executed by the processing circuitry, cause the processing circuitry to:

evaluate access rights granted to one or more computerized resources, wherein the said evaluation comprises (i) determining access rights granted to one or more users in a group, (ii) determining access rights granted to the group, (iii) determining a hierarchal level of the one or more users in the group in which each user is organized at one of a plurality of hierarchal levels such that the respective hierarchal levels describe a corresponding level of access rights and a user at a higher hierarchal level is entitled to extra access rights over a sub-ordinate user at a lower hierarchal level, and (iv) determining a role of the one or more users in the group such that at least one role enables a sub-ordinate user to have similar access rights to a user at a higher hierarchal level;

determine appropriate access rights for each of the one or more users in the group based on the access rights granted to the group and the hierarchal level of the respective users and the role of the one or more users in the group;

compare the access rights granted to each of the one or more users in the group against the appropriate access rights for that user in order to determine if excessive access rights have been granted to that user; and based on the comparison, control access to the one or more computerized resources by modifying the access rights of one or more users having excessive access rights such that the one or more users are prevented from exercising the excessive access rights in connection with the one or more computerized resources.

3. A computer program product having a non-transitory computer readable medium which stores a set of instructions, the set of instructions, when carried out by processing circuitry, causing the processing circuitry to perform a method, the method comprising:

evaluating access rights granted to one or more computerized resources, wherein the said evaluation comprises (i) determining access rights granted to one or more users in a group, (ii) determining access rights granted to the group, (iii) determining a hierarchal level of the one or more users in the group in which each user is organized at one of a plurality of hierarchal levels such that the respective hierarchal levels describe a corresponding level of access rights and a user at a higher hierarchal level is entitled to extra access rights over a sub-ordinate user at a lower hierarchal level, and (iv) determining a role of the one or more users in the group such that at least one role enables a sub-ordinate user to have similar access rights to a user at a higher hierarchal level;

determining appropriate access rights for each of the one or more users in the group based on the access rights granted to the group and the hierarchal level of the respective users and the role of the one or more users in the group;

comparing the access rights granted to each of the one or more users in the group against the appropriate access rights for that user in order to determine if excessive access rights have been granted to that user; and based on the comparison, controlling access to the one or more computerized resources by modifying the access rights of one or more users having excessive access rights such that the one or more users are prevented from exercising the excessive access rights in connection with the one or more computerized resources.

\* \* \* \* \*